US012769818B2

(12) United States Patent
Dower et al.

(10) Patent No.: US 12,769,818 B2
(45) Date of Patent: Oct. 20, 2026

(54) DONGLES FOR USB TYPE-C AUTHENTICATION

(71) Applicant: Hewlett-Packard Development Company, L.P., Spring, TX (US)

(72) Inventors: Glen Douglas Dower, Fort Collins, CO (US); Christopher Ritchie Tabarez, Fort Collins, CO (US); Nicolas James Jurich, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 354 days.

(21) Appl. No.: 18/006,258

(22) PCT Filed: Jul. 23, 2020

(86) PCT No.: PCT/US2020/043268

§ 371 (c)(1),
(2) Date: Jan. 20, 2023

(87) PCT Pub. No.: WO2022/019912

PCT Pub. Date: Jan. 27, 2022

(65) Prior Publication Data

US 2023/0315832 A1 Oct. 5, 2023

(51) Int. Cl.

*G06F 21/44* (2013.01)
*G06F 13/42* (2006.01)
*G06F 21/34* (2013.01)

(52) U.S. Cl.

CPC .......... *G06F 21/44* (2013.01); *G06F 13/4282* (2013.01); *G06F 21/34* (2013.01); *G06F 2213/0042* (2013.01)

(58) Field of Classification Search

None
See application file for complete search history.

(56) References Cited

U.S. PATENT DOCUMENTS

| | | | |
|---|---|---|---|
| 8,509,691 | B2 | 8/2013 | Lydon et al. |
| 8,954,624 | B2 | 2/2015 | Rosenan et al. |
| 9,887,967 | B2 | 2/2018 | Van Roermund et al. |
| 10,049,206 | B2 | 8/2018 | Rubinstein et al. |

(Continued)

FOREIGN PATENT DOCUMENTS

| | | | |
|---|---|---|---|
| CN | 101099157 | A | 1/2008 |
| CN | 101699458 | A | 4/2010 |
| WO | 2006/090091 | A1 | 8/2006 |

OTHER PUBLICATIONS

DVI Parrot as posted on <bromptontech.com/dvi-parrot> on Dec. 17, 2014 (Year: 2014).*

(Continued)

*Primary Examiner* — Scott B Christensen
(74) *Attorney, Agent, or Firm* — Quarles & Brady LLP

(57) ABSTRACT

A dongle includes an upstream facing Universal Serial Bus (USB) Type-C port and a downstream facing USB Type-C port. The dongle also includes a security processor communicatively coupled between the upstream facing USB Type-C port and the downstream facing USB Type-C port. The security processor is to, with the upstream facing USB Type-C port connected to a host and the downstream facing USB Type-C port connected to a device, authenticate the dongle in response to an authentication initiation request from the host.

18 Claims, 5 Drawing Sheets

(56) References Cited

U.S. PATENT DOCUMENTS

| | | | | |
|---|---|---|---|---|
| 10,268,815 | B2 | 4/2019 | Dunstan | |
| 2004/0240667 | A1* | 12/2004 | Lee | H04L 9/0662 380/46 |
| 2010/0075604 | A1 | 3/2010 | Lydon et al. | |
| 2014/0281527 | A1* | 9/2014 | Kobres | G06F 21/44 713/168 |
| 2015/0082049 | A1 | 3/2015 | Rubinstein et al. | |
| 2016/0127671 | A1 | 5/2016 | Hundal et al. | |
| 2016/0378704 | A1 | 12/2016 | Adamson et al. | |
| 2017/0038810 | A1 | 2/2017 | Ueki | |
| 2018/0343238 | A1 | 11/2018 | Tola | |
| 2020/0252886 | A1* | 8/2020 | Park | H04W 52/34 |

OTHER PUBLICATIONS

Universal Serial Bus Security Foundation Specification Revision 1.0, published Jan. 7, 2019 (Year: 2019).*

* cited by examiner

DONGLES FOR USB TYPE-C AUTHENTICATION

BACKGROUND

The Universal Serial Bus (USB) Type-C Authentication Specification may be used to restrict the types of devices that may connect to a host system through a USB Type-C port of the host system. The basic principle of the specification is that a device sends verifiable information about itself in the form of a secure certificate chain. The host system then uses this information to determine whether the host system should allow the device to connect and share information with the host system. The criteria used to determine whether a device should be allowed to connect to the host system is called an authentication policy.

DETAILED DESCRIPTION

Figure 1A:
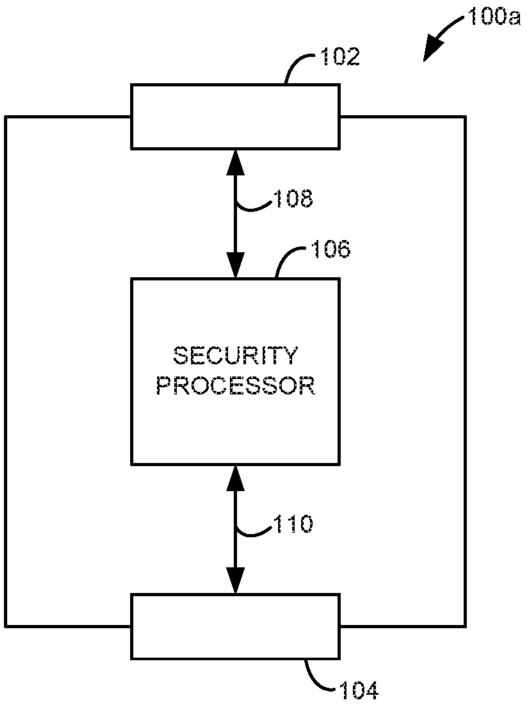
FIGS. 1A-1C are block diagrams illustrating various examples of a dongle.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An organization's Information Technology (IT) department (or other entity) may set a Universal Serial Bus (USB) authentication policy that mandates that USB devices be signed prior to allowing the USB devices to connect to host systems within the organization. By signing devices, a high level of security and control is ensured for USB devices that are connected to the host systems. Any USB device not signed by the IT department would not be able to exchange information with host systems within the organization.

Implementing a USB authentication policy, however, may have some limitations. USB devices on the market supporting the authentication specification might be limited, and the IT department might not be able to find USB devices for certain tasks. It might be difficult for the IT department to sign multiple types of USB devices to support different tasks. Time sensitive USB device tasks might arise that do not allow time for the IT department to sign the USB device. In some cases, it may be desirable to connect legacy USB devices that do not support authentication to the organization's host systems. Further, instead of limiting the USB devices that may be used, a different intent for the organization's security might be to limit the people who have authority to use the USB ports of the host systems within the organization.

Accordingly, disclosed herein are dongles including an upstream facing USB Type-C port (e.g., male port), a downstream facing USB Type-C port (e.g., female port), and a security processor between the upstream facing USB Type-C port and the downstream facing USB Type-C port. The dongle may be used between a USB Type-C authentication-enabled host and a USB Type-C device that does not support authentication. The security processor responds to authentication initiation requests from the host to authenticate the dongle, such that the USB Type-C device may communicate and share data with the host. In this way, USB Type-C devices that do not support authentication may be used with USB Type-C authentication-enabled hosts.

By using the dongles disclosed herein, devices do not need to support the authentication protocol since the authentication responsibilities are performed by the security processor in the dongle. This enables any USB Type-C device to be used with the dongle. The devices are not constrained once the dongle is connected to the authentication host's port. An organization could implement tiers of USB access levels through dongle implementation. A first group of dongles could be distributed to a small group of individuals that have certificates that allow them to access a group of highly secure host systems. A larger second group of dongles with different certificates could be distributed to a larger group of individuals to access a group of less-secure host systems.

An IT department may sign the dongles and distribute them to select employees (e.g., to employees who are authorized and trusted to use the USB ports of the organization's host systems). The IT department may set an authentication policy for authorized dongles that are allowed to connect to a host port. Using this architecture, an individual uses a signed dongle plugged into the host system's USB Type-C port to connect a USB Type-C device to the host system's USB Type-C port. Individuals without a signed dongle cannot use the authentication-enabled USB Type-C ports. Therefore, instead of restricting USB usage to particular devices (as the USB Type-C Authentication Specification was intended to do), the dongles and methods disclosed herein restrict USB usage to particular users in possession of a signed dongle. Since the signed dongles do not rely on the USB devices to respond to authentication requests, non-authenticated and non-signed USB devices may be used in the system as long as the user of these devices has a signed dongle between the host and the device. This signed dongle is a type of "master key" that a user possesses to use a host system's authenticated USB Type-C ports.

The USB Type-C Authentication Specification defines a mechanism for a USB Type-C device to contain a chain of certificates to securely identify itself to a USB Type-C host. In one example, the authentication uses a chain of X.509 certificates encoded in ANS.1 format. The certificates are asymmetrically encrypted with elliptic curve mechanisms (e.g., ECC-ECDSA) to secure the delivery of the certificate chain through public/private key exchange with the host. In the mechanism specified, the USB Type-C authentication "master key" dongle will keep the private key and will transfer a public key (e.g., ECDSA key) to the host. For USB Type-C devices that support authentication, there is a set of information about the device that can be transmitted to the USB Type-C host through the X.509 certificate chain. This information is listed in table A-25 of the USB Type-C Authentication Specification. As such, the dongles disclosed herein may contain values for Version, XID, and Security Description.

Per the USB Type-C Authentication Specification, a host system cannot have two connected devices using the same private key. If an organization wishes to connect multiple dongles to a system simultaneously, each dongle should include a different private key. Each dongle may be configured by an IT department (or other entity) with desired information and/or private key(s). This enables the IT department to verify that the dongle belongs to their organization.

FIG. 1A is a block diagram illustrating one example of a dongle 100*a*. Dongle 100*a* includes an upstream facing USB Type-C port 102, a downstream facing USB Type-C port 104, and a security processor 106. Security processor 106 is communicatively coupled between the upstream facing USB Type-C port 102 and the downstream facing USB Type-C port 104. Security processor 106 is communicatively coupled to the upstream facing USB Type-C port 102 through a communication link 108 and to the downstream facing USB Type-C port 104 through a communication link 110.

The upstream facing USB Type-C port 102 and the downstream facing USB Type-C port 104 may include pins for USB 2.0 differential pairs (i.e., D+ and D−), power and ground pins (i.e., VBUS and GND), pins for transmit and receive differential pairs (i.e., TX1+, TX1−, RX1+, RX1−, TX2+, TX2−, RX2+, RX2−), channel configuration pins (i.e., CC1 and CC2), power supply pin (i.e., VCONN), and alternate mode pins (i.e., SBU1 and SBU2), as specified by the USB Type-C standard.

Security processor 106 may include a MicroController Unit (MCU), a Programmable System On a Chip (PSOC), a Central Processing Unit (CPU), an embedded controller, or another suitable processor. Security processor 106 may be based on the ARM Cortex Cyptolsland or TrustZone architectures or another suitable security architecture. The security processor is to, with the upstream facing USB Type-C port 102 connected to a host and the downstream facing USB Type-C port 104 connected to a device, authenticate the dongle 100*a* in response to an authentication initiation request from the host. The authentication may be implemented based on the USB Type-C Authentication Specification.

Figure 1B:
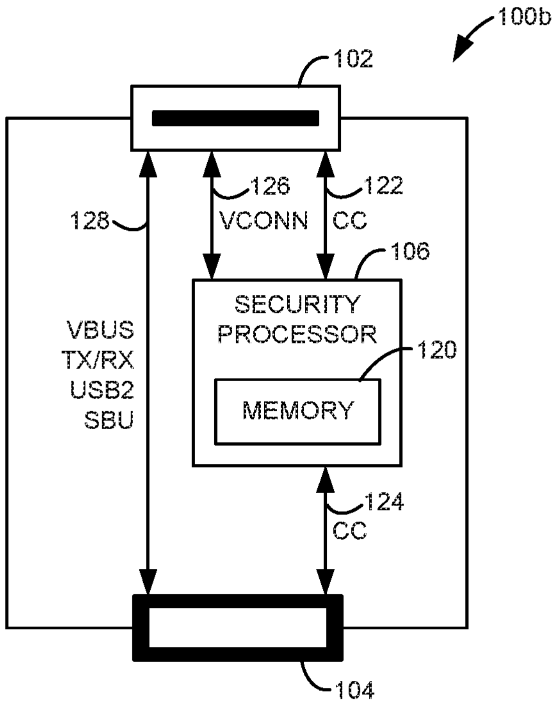

FIG. 1B is a block diagram illustrating another example of a dongle 100*b*. Dongle 100*b* includes an upstream facing USB Type-C port 102, a downstream facing USB Type-C port 104, and a security processor 106 as previously described and illustrated with reference to FIG. 1A. In this example, security processor 106 includes a memory 120. Security processor 106 is communicatively coupled to the upstream facing USB Type-C port 102 through upstream facing CC lines 122 and communicatively coupled to the downstream facing USB Type-C port 104 through downstream facing CC lines 124. A VCONN input of the security processor 106 is electrically coupled to the upstream facing USB Type-C port 102 through a VCONN line 126. The upstream facing USB Type-C port 102 is electrically coupled to the downstream facing USB Type-C port 104 directly through VBUS, TX/RX, USB2, and SBU lines 128. Thus, lines 128 bypass security processor 106.

In this example, the upstream facing USB Type-C port 102 includes an upstream facing male USB Type-C port and the downstream facing USB Type-C port 104 includes a downstream facing female USB Type-C port. Memory 120 stores machine readable instructions executable by the security processor 106, a private key(s), and a secure certificate (s) used to authenticate dongle 100*b*. Memory 120 may be integral to security processor 106 as illustrated in FIG. 1B or separate from and communicatively coupled to security processor 106 as will be described below with reference to FIG. 1C. Memory 120 may be a Read-Only Memory (ROM), such as a Serial Peripheral Interface (SPI) ROM, an Electrically Erasable Programmable Read-Only Memory (EEPROM), a flash memory, or another suitable ROM.

In this example, the security processor 106 is to receive authentication commands and non-authentication commands (from a host) through the upstream facing CC lines 122. The security processor 106 responds to the authentication commands through the upstream facing CC lines 122 and passes the non-authentication commands to the downstream facing CC lines 124 (to a USB device). The security processor 106 passes responses to the non-authentication commands (from the USB device) on the downstream facing CC lines 124 to the upstream facing CC lines 122 (to the host). The VCONN line 126 may be used to power (via the host) the security processor 106 with the upstream facing USB Type-C port 102 connected to the host. VBUS, TX/RX, USB2, and SBU signals pass directly between the upstream facing USB Type-C port 102 and the downstream facing USB Type-C port 104 through VBUS, TX/RX, USB2, and SBU lines 128.

In more detail, in one example, the authentication of dongle 100*b* may proceed as follows. The dongle 100*b* is attached to a USB device through the downstream facing USB Type-C port 104 and to a host through the upstream facing USB Type-C port 102. The host acts as an authentication initiator and sends a query over the CC lines 122 to acquire a public key and a chain of X.509 certificates from the security processor 106. The security processor 106 receives the authentication initiation requests and provides the certificates including values for Version, XID, and Security Description. In addition, the security processor 106 may provide custom information injected by an IT department (or other entity) to allow the security processor 106 to validate itself as a master key that should be allowed to access the host. The security processor 106 performs the tasks of an "authentication responder" as defined in the USB Type-C Authentication Specification. Once the authentication is complete and valid certificates have been provided to the host by the security processor 106, the USB device is allowed to connect to the host for information sharing.

After authentication, the host may perform standard power delivery (PD) commands to gather information and configure the USB device. When the dongle 100*b* receives a PD request through CC lines 122 that is not an authentication packet, the security processor 106 forwards that PD request to the USB device through CC lines 124. The USB device then responds to the command through the CC lines 124. In this case, the security processor 106 forwards the response back to the host through the CC lines 122. That is, if an authentication request comes from the host through the CC lines 122, the security processor 106 responds directly to that request. If a standard PD command comes from the host through the CC lines 122, the security processor 106 forwards that command to the USB device attached to the dongle 100*b* through CC lines 124 and forwards the response from the USB device back to the host.

Once the security processor 106 has responded to the authentication commands from the host and the USB device has responded to the standard PD commands from the host (forwarded through the dongle), the USB device attached to the dongle is allowed to have a USB connection to the host. USB signals carrying information pass directly through the dongle 100*b* bypassing security processor 106. If the longest-allowed cables are to be used with the dongle 100*b*, the dongle may implement a signal conditioner as described below with reference to FIG. 1C to compensate for any signal degradation induced by the dongle.

Figure 1C:
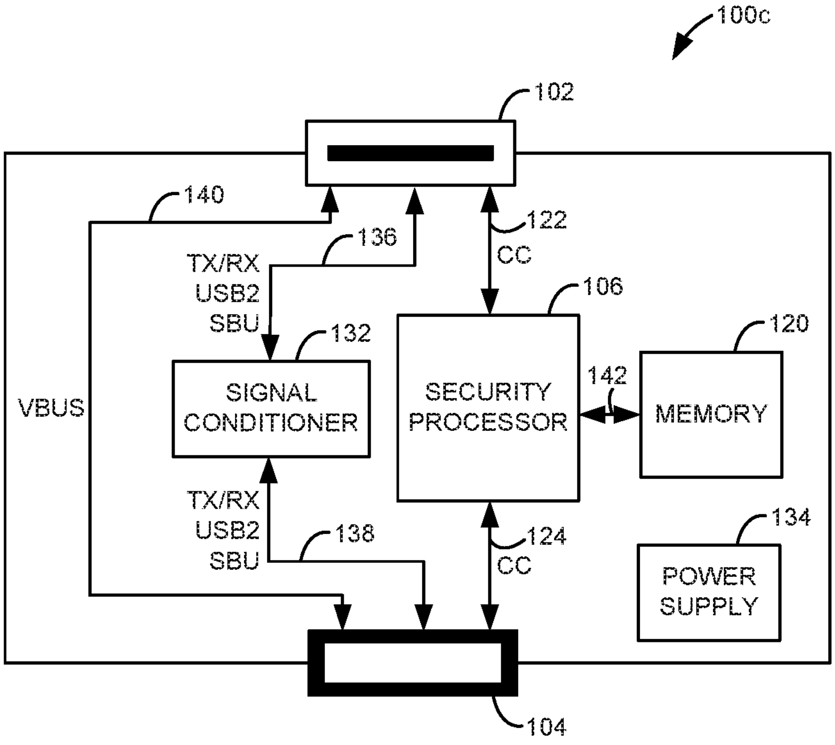

FIG. 1C is a block diagram illustrating another example of a dongle 100*c*. Dongle 100*c* includes an upstream facing male USB Type-C port 102, a downstream facing female USB Type-C port 104, and a security processor 106 as previously described and illustrated with reference to FIG. 1B. In this example, dongle 100*c* includes a memory 120 communicatively coupled to security processor 106 through a communication link 142. Dongle 100*c* also includes a power supply 134 and a signal conditioner 132.

Power supply 134 may be used to power the security processor 106, memory 120, and signal conditioner 132. Power supply 134 may include an AC or DC input to receive input power and/or a battery(s) to provide input power. Power supply 134 includes circuitry suitable to provide a regulated supply voltage (e.g., Vdd) to power security processor 106, memory 120, and signal conditioner 132. In this example, power supply 134 may be used in place of the VCONN input.

Security processor 106 is communicatively coupled to the upstream facing USB Type-C port 102 through upstream facing CC lines 122 and communicatively coupled to the downstream facing USB Type-C port 104 through downstream facing CC lines 124. Signal conditioner 132 is electrically coupled to the upstream facing USB Type-C port 102 through upstream facing TX/RX, USB2, and SBU lines 136 and electrically coupled to the downstream facing USB Type-C port 104 through downstream facing TX/RX, USB2, and SBU lines 138. Signal conditioner 132 conditions (e.g., retimes, amplifies, filters noise, etc.) TX/RX, USB2, and SBU signals passing between the upstream facing USB Type-C port 102 and the downstream facing USB Type-C port 104. The upstream facing USB Type-C port 102 is electrically coupled to the downstream facing USB Type-C port 104 directly through VBUS lines 140. Thus, the VBUS lines 140 bypass both the security processor 106 and the signal conditioner 132.

Figure 2:
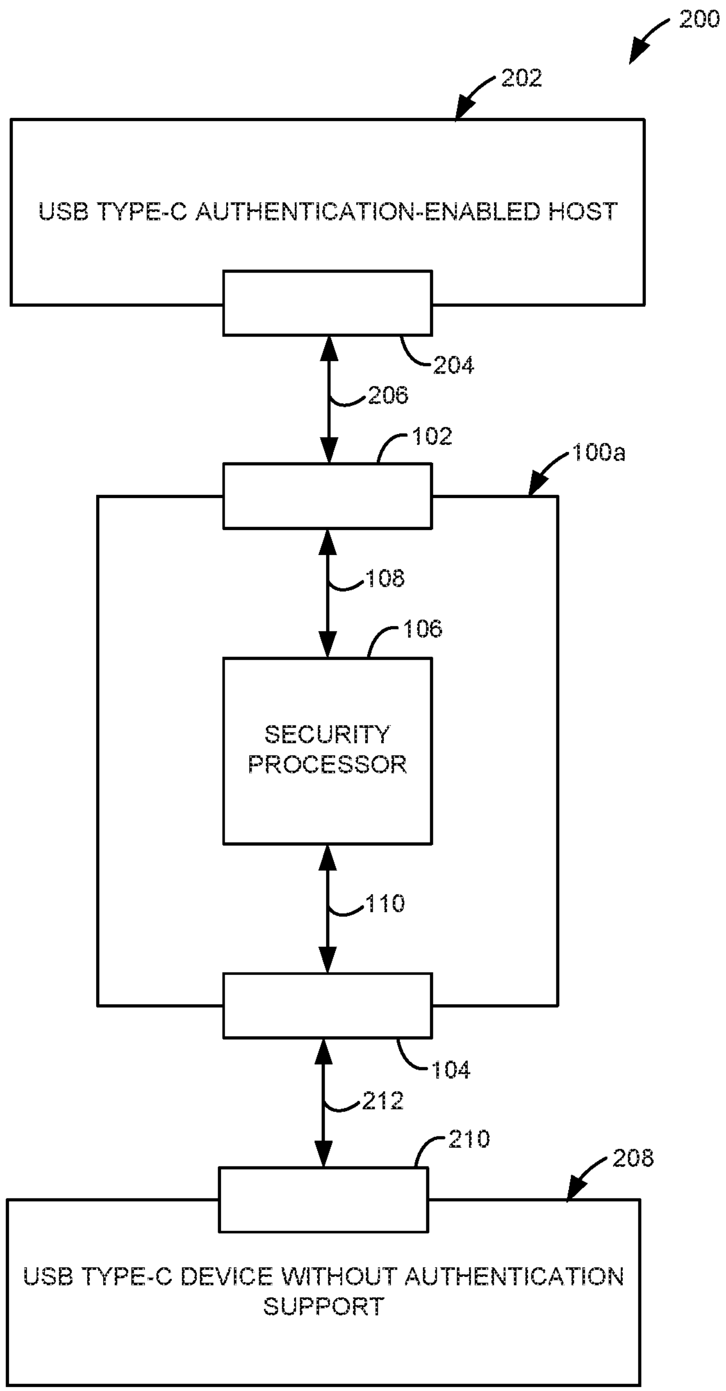
FIG. 2 is a block diagram illustrating one example of a system.

FIG. 2 is a block diagram illustrating one example of a system 200. System 200 includes a dongle 100*a* as previously described and illustrated with reference to FIG. 1A, a USB Type-C authentication enabled host 202, and a USB Type-C device 208 without authentication support. In other examples, dongle 100*b* or 100*c* previously described and illustrated with reference to FIGS. 1B and 1C, respectively, may be used in place of dongle 100*a*. USB Type-C authentication enabled host 202 includes a USB Type-C port 204. USB Type-C device 208 includes a USB Type-C port 210. The upstream facing USB Type-C port 102 of dongle 100*a* is communicatively coupled to the USB Type-C port 204 of the USB Type-C authentication enabled host 202 through a communication link 206 (e.g., a USB Type-C cable). The downstream facing USB Type-C port 104 of dongle 100*a* is communicatively coupled to the USB Type-C port 210 of the USB Type-C device 208 through a communication link 212 (e.g., a USB Type-C cable).

Security processor 106 is to, with the upstream facing USB Type-C port 102 connected to the USB Type-C authentication-enabled host 202 and the downstream facing USB Type-C port 104 connected to the USB Type-C device 208 that does not support authentication, authenticate the dongle 100*a* to enable USB communications between the host 202 and the device 208. In one example, the security processor 106 is to authenticate a user prior to authenticating the dongle 100*a*. For example, the security processor 106 may request a password entry or biometric verification from a user prior to authenticating the dongle 100*a*. This user authentication would ensure that the dongle 100*a* is authenticated by a specific user before use. By having a user input a password or biometric prior to using the dongle, if the dongle is lost or falls into the wrong hands, the dongle cannot be used by another individual. The security processor 106 may process the user authentication data and determine whether the dongle should be allowed to perform the USB Type-C authentication process.

Figure 3A:
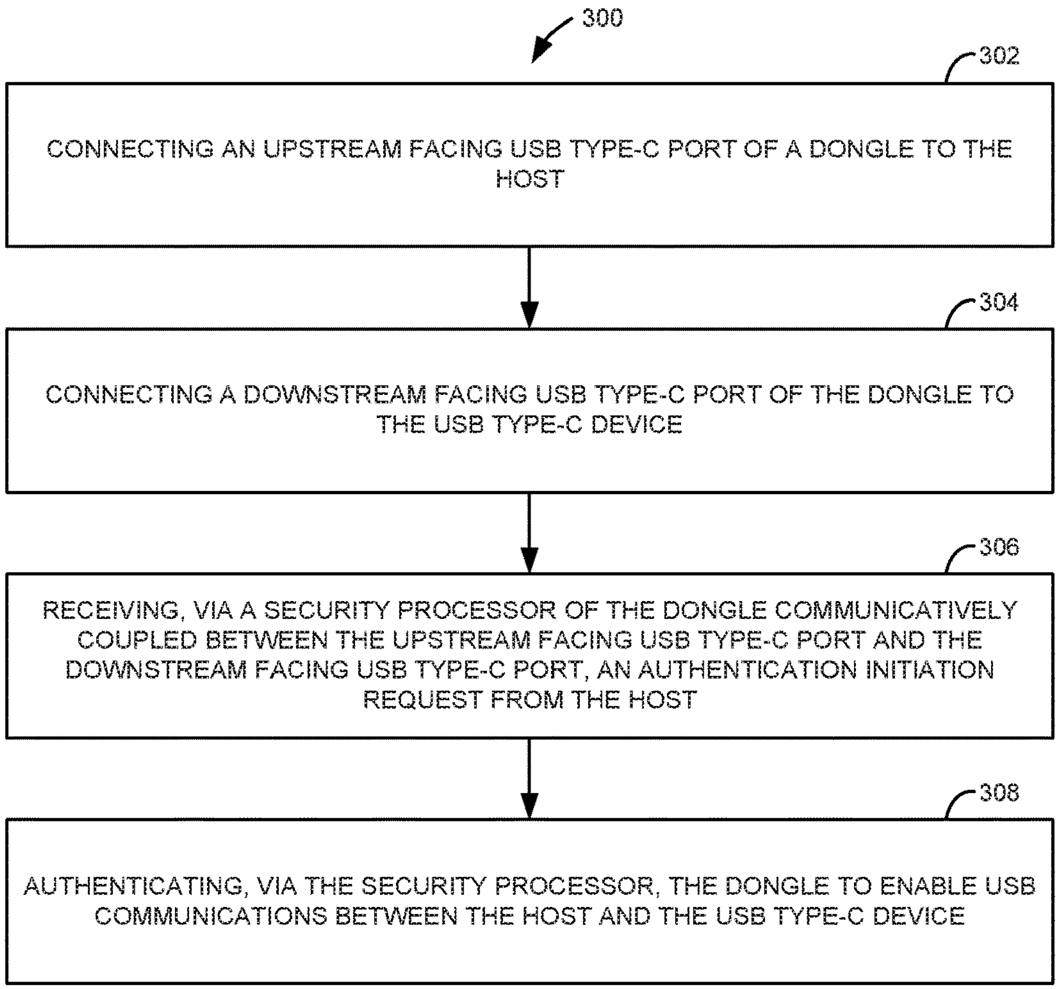
FIGS. 3A-3D are flow diagrams illustrating one example of a method to authenticate a Universal Serial Bus (USB) Type-C device to a USB Type-C authentication-enabled host.

FIGS. 3A-3D are flow diagrams illustrating one example of a method 300 to authenticate a USB Type-C device (e.g., 208 of FIG. 2) to a USB Type-C authentication-enabled host (e.g., 202 of FIG. 2). As illustrated in FIG. 3A at 302, method 300 includes connecting an upstream facing USB Type-C port (e.g., 102) of a dongle (e.g., 100*a*, 100*b*, or 100*c*) to the host. At 304, method 300 includes connecting a downstream facing USB Type-C port (e.g., 104) of the dongle to the USB Type-C device. At 306, method 300 includes receiving, via a security processor (e.g., 106) of the dongle communicatively coupled between the upstream facing USB Type-C port and the downstream facing USB Type-C port, an authentication initiation request from the host. At 308, method 300 includes authenticating, via the security processor, the dongle to enable USB communications between the host and the USB Type-C device. In one example, authenticating the dongle includes transmitting, via the security processor, a public key and a chain of certificates to the host in response to the authentication initiation request.

Figure 3B:
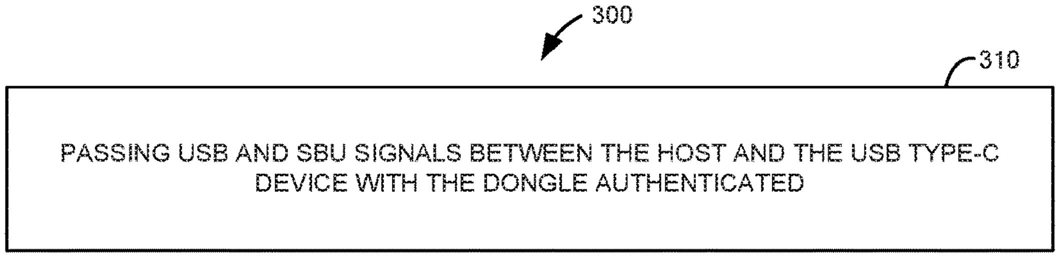
Figure 3C:
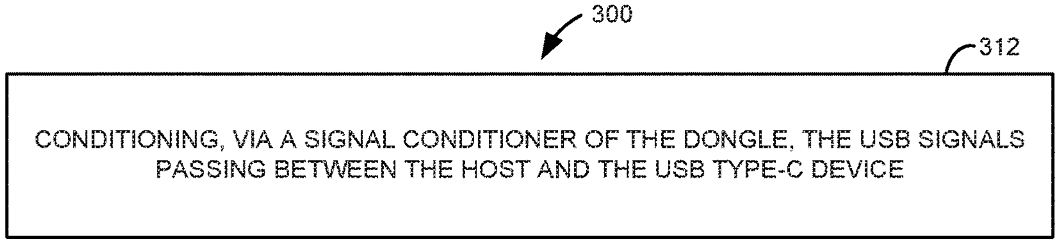

As illustrated in FIG. 3B at 310, method 300 may further include passing USB and SBU signals between the host and the USB Type-C device with the dongle authenticated. As illustrated in FIG. 3C at 312, method 300 may further include conditioning, via a signal conditioner (e.g., 132 of FIG. 1C) of the dongle, the USB signals passing between the host and the USB Type-C device.

Figure 3D:
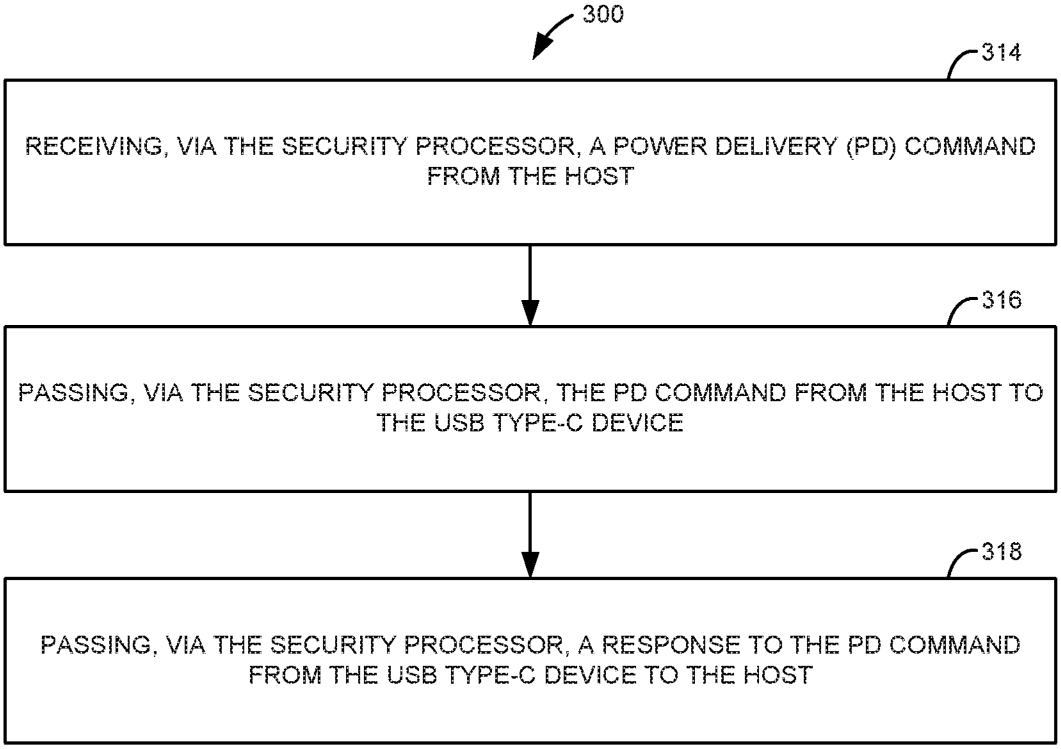

As illustrated in FIG. 3D at 314, method 300 may further include receiving, via the security processor, a power delivery (PD) command from the host (e.g., through CC lines 122). At 316, method 300 may further include passing, via the security processor, the PD command from the host to the USB Type-C device (e.g., through CC lines 124). At 318, method 300 includes passing, via the security processor, a response to the PD command from the USB Type-C device to the host.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A dongle comprising:

an upstream facing Universal Serial Bus (USB) Type-C port;

a downstream facing USB Type-C port;

a private key that is different from a second private key of a second dongle; and a security processor communicatively coupled to the upstream facing USB Type-C port through a first communication link and the downstream facing USB Type-C port through a second communication link that is different from the first communication link, the security processor to, with the upstream facing USB Type-C port connected to a host and the downstream facing USB Type-C port connected to a device, authenticate the dongle in response to an authentication initiation request from the host and forward a command to the second communication link in response to receiving a non-authentication power-delivery command from the host;

wherein the dongle is configured to be simultaneously connected to the host with the second dongle, the second dongle comprising:

an upstream facing USB Type-C port;

a downstream facing USB Type-C port; and a security processor communicatively coupled to the upstream facing USB Type-C port through a first communication link and to the downstream facing USB Type-C port through a second communication link, the security processor to, with the upstream facing USB Type-C port connected to the host and the downstream facing USB Type-C port connected to a third device, authenticate the second dongle in response to an authentication initiation request from the host.

2. The dongle of claim 1, wherein the security processor is communicatively coupled to the upstream facing USB Type-C port through upstream facing CC lines and communicatively coupled to the downstream facing USB Type-C port through downstream facing CC lines.

3. The dongle of claim 2, wherein the security processor is to receive authentication commands and non-authentication commands through the upstream facing CC lines, respond to the authentication commands through the upstream facing CC lines, pass the non-authentication commands to the downstream facing CC lines, and pass responses to non-authentication commands on the downstream facing CC lines to the upstream facing CC lines.

4. The dongle of claim 1, further comprising:

VBUS lines directly connected between the upstream facing USB Type-C port and the downstream facing USB Type-C port;

transmit (TX) and receive (RX) lines directly connected between the upstream facing USB Type-C port and the downstream facing USB Type-C port;

USB2 lines directly connected between the upstream facing USB Type-C port and the downstream facing USB Type-C port; and SBU lines directly connected between the upstream facing USB Type-C port and the downstream facing USB Type-C port.

5. The dongle of claim 1, wherein the upstream facing USB Type-C port comprises an upstream facing male USB Type-C port and the downstream facing USB Type-C port comprises a downstream facing female USB Type-C port.

6. A dongle comprising:

an upstream facing Universal Serial Bus (USB) Type-C port;

a downstream facing USB Type-C port;

a private key that is different from a second private key of a second dongle; and a security processor communicatively coupled to the upstream facing USB Type-C port through a first communication link and the downstream facing USB Type-C port through a second communication link that is different from the first communication link, the security processor to, with the upstream facing USB Type-C port connected to a USB Type-C authentication-enabled host and the downstream facing USB Type-C port connected to a USB Type-C device that does not support authentication, authenticate the dongle to enable USB communications between the host and the device;

wherein the security processor is to directly respond to authentication commands received on the first communication link and to forward only non-authentication power-delivery commands to the USB Type-C device via the second communication link without forwarding host-originated authentication commands to the USB Type-C device; and wherein the dongle is configured to be simultaneously connected to the host with the second dongle, the second dongle comprising:

an upstream facing USB Type-C port;

a downstream facing USB Type-C port; and a security processor communicatively coupled to the upstream facing USB Type-C port through a first communication link and to the downstream facing USB Type-C port through a second communication link, the security processor to, with the upstream facing USB Type-C port connected to the host and the downstream facing USB Type-C port connected to a third device, authenticate the second dongle in response to an authentication initiation request from the host.

7. The dongle of claim 6, wherein the security processor is to authenticate a user prior to authenticating the dongle.

8. The dongle of claim 6, wherein the security processor comprises a VCONN input electrically coupled to the upstream facing USB Type-C port to power the security processor with the upstream facing USB Type-C port connected to the host.

9. The dongle of claim 6, further comprising:

a power supply to power the security processor.

10. The dongle of claim 6, further comprising:

a memory communicatively coupled to the security processor to store a private key, certificates, and machine readable instructions for authenticating the dongle.

11. The dongle of claim 1, wherein information is verifiable using the private key, the information including ownership information for the dongle.

12. The dongle of claim 6, wherein the dongle is to be configured with information and a private key.

13. The dongle of claim 12, wherein the private key is to verify ownership of the dongle.

14. A method to authenticate a Universal Serial Bus (USB) Type-C device to a USB Type-C authentication-enabled host, the method comprising:

connecting an upstream facing USB Type-C port of a dongle to the host through a first communication link, the dongle comprising a private key that is different from a second private key of a second dongle;

connecting a downstream facing USB Type-C port of the dongle to the USB Type-C device through a second communication link that is different from the first communication link;

receiving, via a security processor of the dongle communicatively coupled to the upstream facing USB Type-C port and the downstream facing USB Type-C port, a non-authentication power delivery command;

forwarding, via the security processor, the non-authentication power-delivery command to the second communication link towards the USB Type-C device;

receiving, via the security processor, an authentication initiation request from the host; and authenticating, via the security processor, the dongle to enable USB communications between the host and the USB Type-C device;

wherein the dongle and a second dongle are simultaneously connected to the host, the second dongle comprising:

an upstream facing USB Type-C port;

a downstream facing USB Type-C port; and a security processor communicatively coupled to the upstream facing USB Type-C port through a first communication link and to the downstream facing USB Type-C port through a second communication link, the security processor to, with the upstream facing USB Type-C port connected to the host and the downstream facing USB Type-C port connected to a third device, authenticate the second dongle in response to an authentication initiation request from the host.

15. The method of claim 14, further comprising:

passing USB and SBU signals between the host and the USB Type-C device with the dongle authenticated.

16. The method of claim 15, further comprising:

conditioning, via a signal conditioner of the dongle, the USB signals passing between the host and the USB Type-C device.

17. The method of claim 14, wherein authenticating the dongle comprises transmitting, via the security processor, a public key and a chain of certificates to the host in response to the authentication initiation request.

18. The method of claim 14, further comprising:

receiving, via the security processor, a power delivery (PD) command from the host;

passing, via the security processor, the PD command from the host to the USB Type-C device; and passing, via the security processor, a response to the PD command from the USB Type-C device to the host.

* * * * *